INVENTOR.
KOICHI OTANI

May 24, 1960  KOICHI OTANI  2,937,565
SAFETY LAMP SWITCH FOR MOVIE PROJECTORS COUPLED
WITH A MAGNETIC SOUND REPRODUCER
Filed Feb. 5, 1958  2 Sheets-Sheet 2
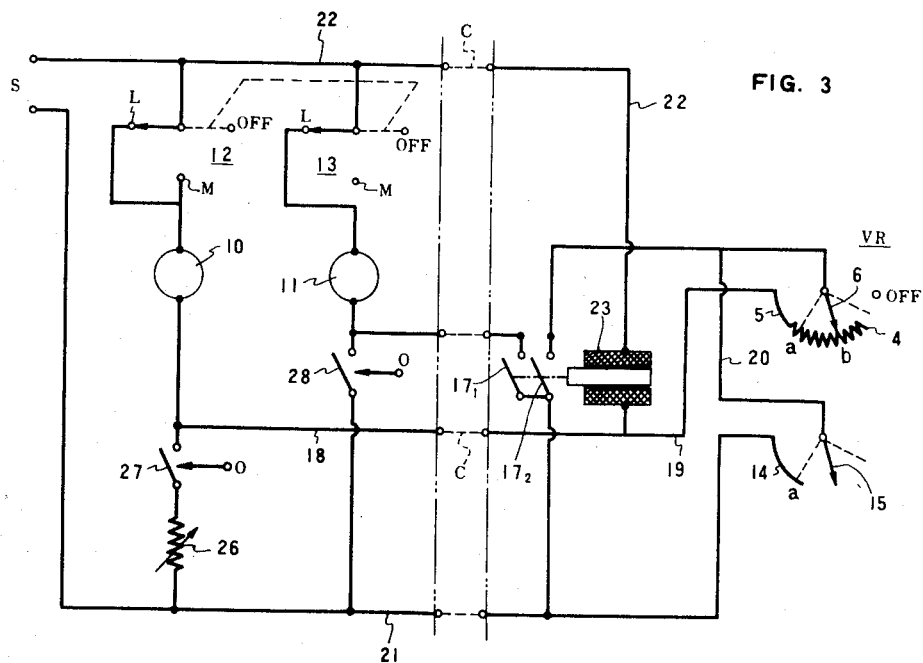
FIG. 3
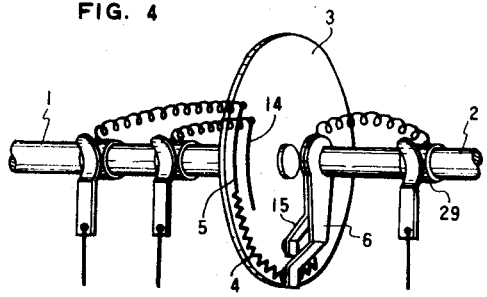
FIG. 4
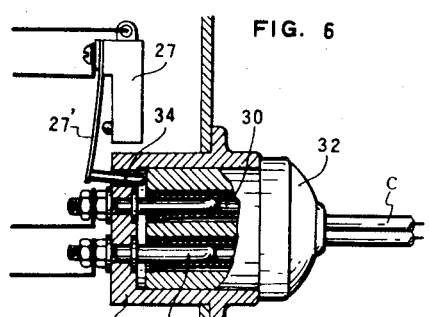
FIG. 6
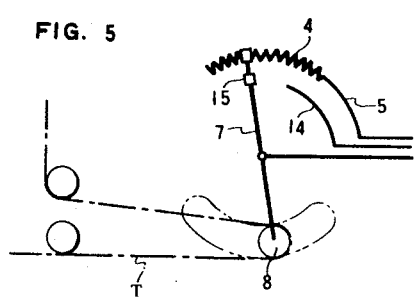
FIG. 5
INVENTOR.
KOICHI OTANI
BY
ATTORNEY

United States Patent Office 2,937,565
Patented May 24, 1960

2,937,565
SAFETY LAMP SWITCH FOR MOVIE PROJECTORS COUPLED WITH A MAGNETIC SOUND REPRODUCER

Koichi Otani, Nakaku, Yokohama, Japan, assignor to Canon Camera Company, Inc., Tokyo, Japan, a corporation of Japan Filed Feb. 5, 1958, Ser. No. 713,344

6 Claims. (Cl. 88—16.2)

This invention relates to motion picture projectors and more particularly to a switch for the projection lamp of motion picture projectors coupled with a magnetic sound reproducer for synchronous operation.

In a motion picture projector, if the projection lamp is lighted while the film driving motor is stopped, the film will be burned out or scorched and damaged. When projecting motion pictures synchronized with the reproduction of sound, film burning trouble frequently occurs because of unintentional and unexpected lighting of the projection lamp while manipulating the switches controlling the devices. The operator must actuate several switches in a predetermined order at the beginning of the projection, and if the projected picture does not synchronize with the reproduced sound, he varies the speed of the projector motor to obtain synchronism. Such operation may well cause the operator incorrectly and in improper sequence, to operate the various switches, in the worst case of which the film burns out.

An object of this invention is to eliminate the above mentioned objection by operatively connecting the switch of the projection lamp with the synchronizing device coupled to the projector so that the film driving motor may be rotated first and thereupon the projection lamp lighted automatically and without difficulty.

Another object of this invention is to provide a lamp switch which does not close until after the motor attains a predetermined speed. In general, the synchronizing device above mentioned function by regulating a resistance connected in series to the motor and it takes some time for the motor to reach the predetermined speed. Therefore, if the lamp is lighted simultaneously with the start of the motor, the film may be burned and damaged.

A further object of this invention is to perfectly protect the film from heat damage by coupling the switch of the projection lamp and the shaft of the projector motor in such manner that the lamp maintains its lighted condition due to a self-holding operation of the lamp switch even when the motor speed decreases somewhat after the coupling switch has once operated in the predetermined sequence.

A clear concept of the scope and purpose of this invention may be obtained from the following description, taken in connection with the attached drawing, in which:

Fig. 3 is a wiring diagram of a modified embodiment of the device of Figure 2 with the lamp switch arranged within the sound synchronizing device;

Figs. 4 and 5 are schematic drawings showing two examples of the main control mechanism; and Fig. 6 shows a socket, a plug and a switch operatively connected therewith.

Figure 1:
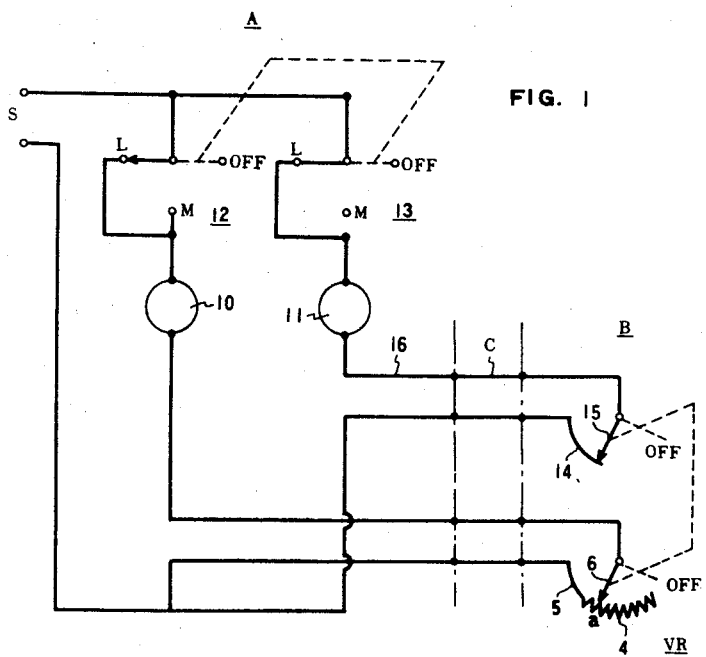
Fig. 1 is a circuit diagram of an illustrative embodiment of the device according to the invention.

The attached drawing shows several of the preferred embodiments of the present invention having the above mentioned function. Portion A shows the wiring of the projector, while portion B shows the wiring of the synchronizing device. C represents the multicable cord connecting the projector and the synchronizing device. The magnetic sound reproducer is omitted in the drawing to simplify the showing and understanding thereof. First of all, the construction of the synchronizing device coupling the projector and the magnetic sound reproducer will be explained. The synchronizing device per se is prior known; compare, for example, British Patent 359,-471. According to the embodiment illustrated in Fig. 4, a shaft 1 connected to the rotary shutter shaft or any other proper driving part of the projector, and a shaft 2 connected to the advancing roller of the sound tape or any other proper driving part of the magnetic sound reproducer, are opposite to, and axially aligned with, each other and rotatable in the same direction. A variable resistance 4 and a short-circuiting piece 5 are arcuately fixed on an insulator plate 3 provided on shaft 1 and a brush 6 is affixed to the other shaft so that, when the film and the sound tape are running at a synchronized speed, there may be no relative movement between resistor 4 and brush 6 and they may rotate as one body without varying the ohmic value of the resistor, i.e., the speed of the projector motor. When, however, the speed of the projector changes and a rotational displacement between both shafts 1 and 2 occurs, the resistor 4 and the brush 6 may move relatively, the resistance of the variable resistor 4 is varied and the projector motor may be electrically controlled to attain the synchronized speed.

In a modified embodiment illustrated in Fig. 5, a sound tape T is tautened on a roller 8 rotatably supported at one end of a lever 7 pivoted at its midlength region so that, if a difference between the speed of projector and that of the magnetic sound reproducer occurs, the lever 7 may swing about its pivot due to the tension of the tape T to regulate the resistance value of the variable resistor 4 and control the speed of the projector motor. Any other mechanisms for detecting the rotation difference to control the motor may be applied.

The main feature of my invention is to operatively connect the switch for the projection lamp with such motor controlling mechanism as is described above. In Figure 1, 10 represents a film driving motor for the projector and 11 represents a projection lamp. Coupled switches 12 and 13 are used in silent projection where the projector alone is operated, whereas they are connected in the illustrated position L for talking motion picture projection. A variable resistor VR is constructed as shown in Figs. 4 or 5. The lamp switch consists of a brush 15 on a movable arm sweeping over and on the arcuate contact piece 14, the movable arm thereof being mechanically coupled to the movable arm of resistor VR.

When the switch of the magnetic sound reproducer, not shown, is switched on, its motor will start but the projector motor 10 is still below the rated speed and hence actuates the rotation difference detecting mechanism effect on the controlling mechanism. When the brush 6, which has been in the Off position, reached the right end (Figures 1 through 3) of resistor 4, the full value of its resistance is connected in circuit and projector motor 10 will be started by the weak current from line source S through resistor 4. While motor 10 slowly runs at the low starting torque, brush 6 moves, in engagement with resistor 4, toward short-circuiting piece 5 decreasing the inserted ohmic value of resistor 4 and increasing the motor speed. When the predetermined speed is attained, while moving the brush 6 somewhat forward and rearward about the position $a$, the standard resistance value at the synchronized speed, brush 6 finally comes to rest at position $a$ producing the synchronized speed of the motor. During the operation of the controlling mechanism, mechanically coupled brush 15 engages switch contact 14 of the lamp circuit and lamp 11 lights up and is maintained lighted. By properly determining the length of switch contact 14 in accordance with the characteristics of the projector motor, the picture film is thus completely protected from heat damage and the possibilty of burning. When the motor of the sound reproducer is stopped, brush 6 of the synchronizing device will return to its original Off position and the lamp will be extinguished by the coupled lamp circuit 16 at the same time. Therefore, burning or damage of the film by a mishandling or by lighting the lamp 11 before the film reaches the predetermined speed.

Figure 2:
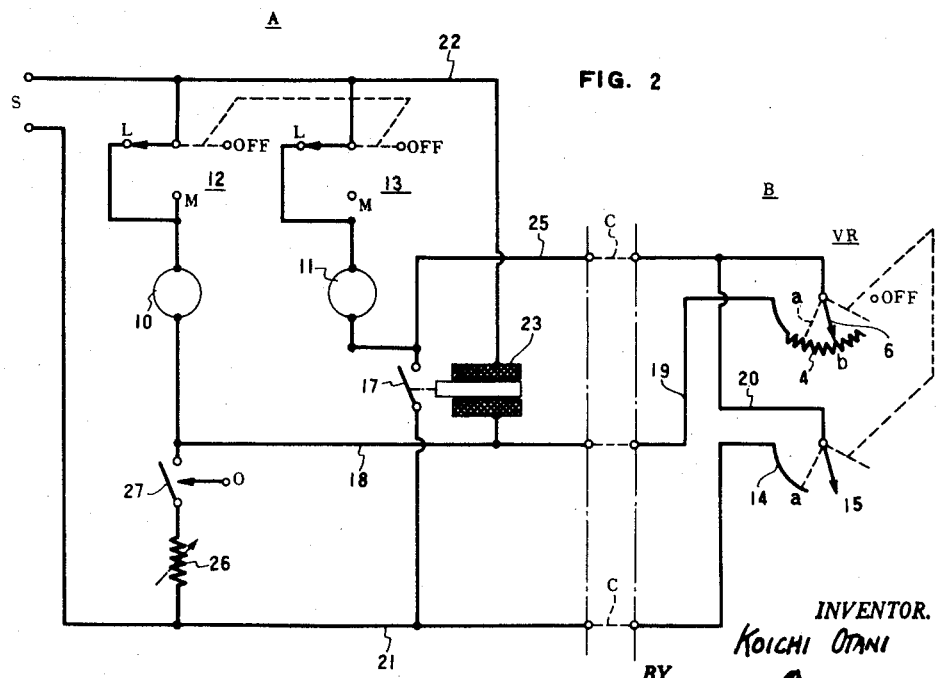
Fig. 2 is a wiring diagram of the present invention with the lamp switch arranged within the projector.

In the modified embodiment illustrated in Figure 2, a solenoid coil 23 is provided in parallel to the projector motor 10 to operate an additional switch arm 17, serially connected to projection lamp 11, and another switch 27 and a variable resistor 26 are serially connected to projector motor 10. The construction of the modified embodiment is otherwise substantially identical with the embodiment shown in Figure 1. As above described, brush 6 of the device shown in Figure 1 oscillates about position a causing the lamp to flicker at times. In the modified embodiment this flicker is eliminated by switch 27. Switch 27 is connected to a plug 32 (Figure 6) and resistor 26 is provided to control the projector motor as will be described below. The feature of this embodiment is in that, once the lamp 11 is lighted, even if the switches 14 and 15 are opened due to the aforementioned oscillation of the lamp switch 15 mechanically coupled with the control resistor VR, the lamp circuit is, nevertheless, maintained closed. In this case, the switches 14 and 15 for the lamp are also used as a switch for the motor, and another proper relay such as an electromagnetic switch 17 is separately provided to eliminate flicker of the projection lamp. When switch 15 comes to the position a in Figure 2 in the manner above mentioned, three circuits, namely, a motor circuit through S—12—10—18—C—19—VR—20—15—14—C—21—S, a relay circuit including the solenoid coil 23 of the electromagnetic switch wired to the motor circuit through S—22—23—18—C—19—VR—20—15—14—C—21—S, and a lamp circuit through S—13—11—25—C—20—15—14—C—21—S are formed. The lamp, therefore, in that brush 6 and resistor 4 are in engagement, lights up regardless of the position of switch arm 15. In this case, the control resistor 4 is greatly reduced in the magnitude of its resistance and a large starting current flows through motor 10, therefore the speed of the projector is sufficient to light up the lamp. The switch 17 in parallel connection with the switches 14 and 15 closes on energization of coil 23. Therefore, even if the controlling resistor VR becomes stationary at the standard resistance position b of Figure 2, and the switches 14 and 15 are opened after the closure of switch 17 at the synchronized speed, the circuits of the motor and coil 23 will be closed through VR—C—25—17 and the lamp circuit is maintained closed by switch 17. That is to say, all the circuits remain closed to continue the synchronized operation. The means to keep the circuits closed will be referred to hereinafter as "self-closing" means. In this embodiment, switch 15 carries the heavy current in the lamp and projector motor before switch 17 closes, with the result that in practice switch 15 of the Figure 2 embodiment lasts relatively a short time.

To eliminate the just mentioned drawback, switch 17 may be modified as shown in Figure 3, in which two switches are provided instead of the single electromagnetic switch 17, a first switch 17₁ for the lamp circuit and a second switch 17₂ for the motor and relay coil, respectively, as the result of which no current from the lamp flows through the switches 14 and 15 so that switches of small current capacity will suffice for this purpose.

In the embodiment illustrated in Fig. 3 the self-closing-means is placed in the side of the synchronizing device. Its operation is identical to the embodiment illustrated in Fig. 2. At times the projector is used for silent motion picture projection without being operatively connected with the magnetic sound reproducer. In this case the switches 12 and 13 should be first switched to the position M from the Off position to start the motor 10, and then switched over to the position L to light the lamp 11. Now the speed of motor 10 is controlled by variable resistance 26 in the projector. In such silent projection synchronizer B and the connecting cord C are removed from projector A, and, in addition, it is necessary to close both switches 27 and 28. For this purpose the plug of the cord C connected to the synchronizing device effects the closure of both switches 27 and 28 as illustrated in Figure 6. Switch 27 is opened by inserting plug 32 into the receptacle 33, an extension 34 from the free end of spring 27' projects from the exterior of receptacle 33 through a bore defined in the receptacle so as to be automatically deflected on the insertion of the plug into the receptacle. Switch 28, shown in Figure 3, has the same structural details as shown for switch 27 in Figure 6. When electric current flows through the motor 10 of the embodiment of Figures 2 and 3, electro-magnet 23 is energized through resistor 26 and switch 27, and said switch 17 need not be operatively connected with the connector. The references O with an arrow in Figures 2 and 3 indicate the switch arms automatically openable and closable by the connector. In Figure 4, slip ring 29 is electrically connected to brush 6 to collect the current by a metal shoe.

According to the present invention, as described above, the switch circuit of the projection lamp is operatively connected with the projector motor controlling mechanism of the synchronizing device so that the lamp may be automatically lighted and extinguished in exact correspondence with the operation of the sound reproducer. Therefore, in the present invention, there is no fear of film burning by mishandling the device. The above described objects can be well attained by the present invention. Thus, the present invention is effective as a safety device for talking motion picture projecting apparatus in which a motion picture projector and a magnetic sound reproducer are operated in synchronism.

What I claim is:

1. Circuit arrangement for the synchronous reproduction of motion pictures and sound including a motion picture film projector, a tape sound reproducer, a synchronizing apparatus, a projection lamp and a driving motor in the projector, a first switch having a movable contact in series with the lamp, a movable second contact in the synchronizing apparatus responsive to differences in tension of the picture film and the sound tape, mechanical coupling means interconnecting both movable contacts, a resistor cooperating with the second movable contact to insert variable portions of the resistor in series with the motor and the movable contact of the first switch, a second switch connected to the lamp in shunt of the first switch and having a movable armature, and a solenoid connected between the resistor and one side of a source of electric potential and adapted on energization to attract the armature to close the second switch so that movement of the sound tape engages the movable contact of the synchronizing apparatus with the resistor to start the motor and thereafter on such movable contact reaching a first predetermined position on the resistor the first switch is closed to light the lamp and on reaching a second predetermined position thereafter energizes the solenoid closing the second switch and retaining the second switch closed even when the moving contact of the synchronizing apparatus returns to a point on the resistor below the second predetermined position corresponding to the synchronized speed of the motor, the solenoid becoming deenergized when such moving contact moves to disengage the resistor due to stoppage of the feed of the sound tape.

2. The circuit arrangement according to claim 1 in which a third switch is serially connected to a second variable resistor, the third switch and second variable resistor being connected to the projector motor in shunt of the synchronizing apparatus resistor and the fixed contact of the first switch, and the third switch is closed and the second variable resistor adjusted to control the speed of the motor when motion pictures are to be projected without sound reproduction.

3. The circuit arrangement according to claim 2 in which the wires connecting the circuit of the projector per se to the synchronizing apparatus are in a cord having a plug at the free end thereof, a socket containing the wire terminations of the projector circuit and adapted to receive the plug, and coupling means on the third switch cooperating with the plug in such manner that on insertion of the plug into the socket to connect the tape sound reproducer to the motion picture projector by way of the synchronizing apparatus the third switch is opened and maintained in open condition.

4. Circuit arrangement for the synchronous reproduction of motion picture with sound from a motion picture projector coupled to a magnetic tape reproducer comprising a resistor, a tap variably positionable on the resistor, a driving motor connected to the tap and connectable to one side of a source of electric current, one end of the resistor being connectable to the other side of the current source, the tap being slidable off the other end of the resistor to disengage therefrom, a switch having an extended fixed terminal and a movable terminal for sliding engagement with the fixed terminal, one end of the fixed terminal being connected to such other side of the current source, the movable terminal having its off position beyond the other end of the fixed terminal, a projection lamp connected to the sliding movable terminal of the switch and connectable to such one side of the current source, and a mechanical coupling between the tap and the movable terminal such that at least a predetermined portion of the resistor is inserted in circuit with the source and the motor before the movable and fixed terminals of the switch engage lighting the lamp, the predetermined resistor portion having such resistance value that the motor drives the film at least at the minimum speed for satisfactory motion picture projection.

5. Circuit arrangement according to claim 4 in which each the resistor and extended fixed terminal of the switch is arcuate, a disc of insulating material supports both the resistor and the fixed terminal of the switch, a first rotatable shaft in the motion picture projector integrally supports the disc, and a second rotatable shaft in the sound reproducer integrally supports the tap and the movable contact in such manner that any change in speed of rotation of the first and the second shafts correspondingly adjusts the resistor relative to the tap and the fixed terminal to the movable terminal of the switch.

6. Circuit arrangement according to claim 4 in which the tap and the movable terminal of the switch are both at the same end region of a lever pivoted substantially at its midregion, and a tension roller rotatably supported at the other end of the lever, the sound tape being tensioned by the roller so that variations in tape tension correspondingly move the lever to adjust both the relative positions of the tap to the resistor and of the movable contact to the fixed terminal of the switch.

References Cited in the file of this patent

FOREIGN PATENTS

| | | |
|---|---|---|
| 323,746 | Germany | Aug. 4, 1920 |
| 359,471 | Great Britain | Apr. 16, 1930 |
| 731,232 | Great Britain | June 1, 1955 |